United States Patent Office  3,555,069
Patented Jan. 12, 1971

3,555,069
SPIROHETEROCYCLIC PENTACOORDINATE
SILICON COMPOUNDS
Cecil L. Frye, Midland, Mich., assignor to Dow Corning Corporation, Midland, Mich., a corporation of Michigan
No Drawing. Filed Dec. 17, 1968, Ser. No. 784,489
Int. Cl. C07d 103/04; C07f 7/18
U.S. Cl. 260—448.8         10 Claims

ABSTRACT OF THE DISCLOSURE

Spiroheterocyclic pentacoordinate silicon compounds useful as corrosion inhibitors and antioxidants in lubricants are disclosed.

---

This invention relates to new spiroheterocyclic pentacoordinate silicon compounds.

More specifically, this invention relates to a spiroheterocyclic pentacoordinate silicon compound having the general formula

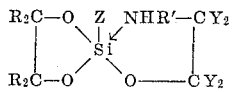

wherein

R is selected from the group consisting of hydrocarbon radicals free of aliphatic unsaturation containing from 1 to 6 carbon atoms and the perfluoromethyl radical, Z is selected from the group consisting of hydrocarbon radicals free of aliphatic unsaturation containing from 1 to 6 carbon atoms and —CH$_2$CH$_2$A radicals wherein A is a perfluoroalkyl radical containing from 1 to 4 carbon atoms, R' is selected from the group consisting of the hydrogen atom and the methyl radical, and Y is selected from the group consisting of the hydrogen atom and the methyl radical.

In the above formula each R can be a hydrocarbon radical free of aliphatic unsaturation containing from 1 to 6 carbon atoms or a perfluoromethyl radical. Specific examples of R include alkyl radicals such as the methyl, ethyl, propyl, butyl, amyl and hexyl radicals; cycloalkyl radicals such as the cyclopentyl and cyclohexyl radicals; aryl radicals such as the phenyl radical; as well as the perfluoromethyl radical.

The Z radical in the above formula can be a hydrocarbon radical free of aliphatic unsaturation containing from 1 to 6 carbon atoms or a —CH$_2$CH$_2$A radical wherein A is a perfluoroalkyl radical containing from 1 to 4 carbon atoms. Specific illustrations of Z include alkyl radicals such as the methyl, ethyl, propyl, butyl, amyl and hexyl radicals; cycloalkyl radicals such as the cyclopentyl and cyclohexyl radicals; aryl radicals such as the phenyl radical; and the —CH$_2$CH$_2$A radicals such as the

—CH$_2$CH$_2$CF$_3$

—CH$_2$CH$_2$CF$_2$CF$_3$

—CH$_2$CH$_2$(CF$_2$)$_3$CF$_3$ and —CH$_2$CH$_2$CF$_2$CF(CF$_3$)$_2$ radicals.

The R' radical in the above formula is limited to the hydrogen atom and the methyl radical.

Each Y radical in the above formula is also limited to the hydrogen atom and the methyl radical.

The above compounds are useful as corrosion inhibitors and antioxidants for lubricating oils and greases, especially hydrocarbon oils and greases. They can be employed in amounts ranging from about 0.1 to about 10 percent by weight, based on the weight of the oil or grease, but generally about 0.5 to about 2 percent is the preferred amount.

The compounds of this invention can be prepared by reacting a heterocyclic silane of the formula

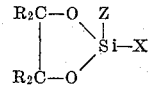

wherein R and Z are as defined heretofore, and X is an alkoxy radical, preferably one containing from 1 to 3 carbon atoms, with an alkanolamine of the formula R'HNCY$_2$CY$_2$OH, wherein R' and Y are as defined heretofore, in a suitable solvent. This reaction can be illustrated by the following equation:

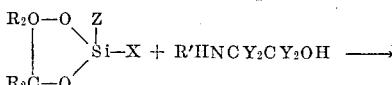

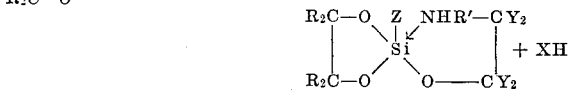

Suitable solvents for carrying out the reaction include aliphatic hydrocarbons such as hexane, heptane and commercially available mixtures such as Stoddard solvent. In some instances, polar solvents such as acetonitrile can also be used, however, in other instances the silicon-nitrogen bond of the siloxazolidine ring of the desired product undergoes disproportionation in such solvents to afford a tetracoordinate and extracoordinate species other than the desired product, and then one must resort to the aliphatic hydrocarbon solvents for the preparation.

The reaction can be carried out at room temperature with the desired product being obtained anywhere from a few minutes to about a week depending on the particular solvent and reactants being used. It will be obvious that the reaction time can be speeded up by gently heating the reaction mixture if so desired. After the reaction is complete, the product is recovered by conventional techniques.

Now in order that those skilled in the art may better understand how the present invention can be practiced, the following examples are given by way of illustration and not by way of limitation.

EXAMPLE 1

A mixture of 198 g. (1.00 mole) of phenyltrimethoxysilane and 118 g. (1.00 mole) of pinacol was heated in the presence of 0.1 g. of sodium methoxide (alkaline catalyst) distilling the methanol from the reaction zone as it formed. This required a time of 5 to 6 hours with a maximum temperature of 2.15° C. being reached. Methanol volatiles in the amount of 64.7 g. were collected. There was some indication of a small amount of phenyl-silicon cleavage in the latter part of the reaction, i.e., the refractive index of the volatiles was somewhat higher, suggesting the presence of some benzene. The crude product was strip distilled and then carefully fractionated on a 36″ x 10 mm. Nester Faust Spinning Band Column to afford a 63% yield (160 g.) of phenyl-(tetramethylethylenedioxy)-methoxysilane,

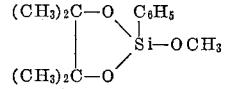

having a boiling point of 85° C. at 0.15 mm. of mercury pressure and a refractive index of $n_D^{25}$ 1.4890. Elemental analysis of this product showed 62.0% C, 6.9% H and 11.08% Si as compared to theoretical values of 61.9% C, 7.94% H and 11.14% Si. Nuclear Magnetic Resonance (NMR) analysis of the product showed a doublet at 8.82 and 8.40τ (cis and trans methyls of the pinacoloxy moiety); a singlet at 6.45τ (methoxy); a complex multiplet at 2.1–2.8τ (phenyl); and the integrated intensity ratios were consistent with the structure. This compound is very hygroscopic and must be protected from atmospheric exposure to avoid hydrolysis.

EXAMPLE 2

To a one-ounce screw-cap vial there was added 15 g. of heptane, 5.04 g. (0.0200 mole) of the silane prepared in Example 1 and 1.50 g. (0.0200 mole) of <p align="center">CH₃NHCH₂CH₂OH</p>

It should be noted that although this alkanolamine is immiscible with heptane, it dissolves immediately as the silane is added. The capped vial was placed in a refrigerator for an hour during which time a large amount of crystalline product deposited. The supernatant solution was decanted and the solid washed with hexane and then vacuum dried to obtain about an 85% yield of

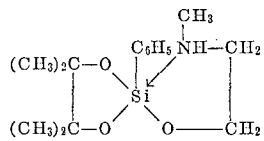

which was found to have a neutral equivalent of 292 as compared to the theoretical value of 295. Recrystallization of the product from heptane produced little change, the product now having a neutral equivalent of 296. Upon dissolution in carbon tetrachloride the silicon-nitrogen bond in the siloxazolidine ring of this compound opens up to afford the tetracoordinate silicon species shown below:

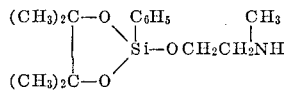

EXAMPLE 3

To a solution of 2.5 g. (0.010 mole) of the silane prepared in Example 1 in 15 cc. of hexane there was added 0.9 g. (0.010 mole) of H₂NC(CH₃)₂CH₂OH whereupon a crystalline solid deposited immediately. This solid dissolved when its hexane suspension was heated to boiling and redeposited upon cooling to room temperature affording a 71% yield (2.21 g.) of

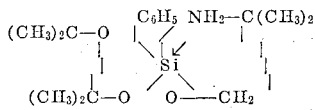

which melts nondescriptly over the range of 50°–120° C. Elemental analysis of the product showed 61.8% C, 9.2% H, 8.5% Si and a neutral equivalent of 308 as compared to theoretical values of 62.6% C, 8.74% H, 9.1% Si and a neutral equivalent of 309.

EXAMPLE 4

The procedure of Example 3 was repeated except that acetonitrile was substituted for the hexane. A 74% yield (2.29 g.) of the product was obtained. It had a neutral equivalent of 308.

EXAMPLE 5

To a solution of 2.5 g. (0.010 mole) of the silane prepared in Example 1 in 5 cc. of acetonitrile there was added 0.61 g. (0.010 mole) of H₂NCH₂CH₂OH whereup a crystalline solid deposited immediately. The liquid was decanted from the product, it was then rinsed twice with acetonitrile, and then evacuated to dryness with an aspirator. A 51% yield (1.44 g.) of

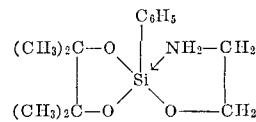

was obtained. Elemental analysis of the product showed 58.9% C, 8.7% H, 9.45% Si and a neutral equivalent of 282 as compared to theoretical values of 59.8% C, 8.2% H, 10.0% Si and a neutral equivalent of 281.

EXAMPLE 6

When the cyclic silanes and alkanolamines set forth below are reacted following the procedure of Example 2, or 3, the indicated products were obtained.

| Silane | Alkanolamine | Product |
|---|---|---|
| (CF₃)₂C—O, CH₂CH₂CF₃ / Si—OC₂H₅ / (CF₃)₂C—O | H₂NCH₂CH₂OH | (CF₃)₂C—O, CH₂CH₂CF₃ / Si, NH₂—CH₂ / (CF₃)₂C—O, O——CH₂ |
| (C₆H₅)₂C—O, C₂H₅ / Si—OC₂H₅ / (C₆H₅)₂C—O | Same as above | (C₆H₅)₂C—O, C₂H₅ / Si, NH₂—CH₂ / (C₆H₅)₂C—O, O——CH₂ |
| (CH₃)₂C—O, C₄H₉ / Si—OC₃H₇ / (CH₃)₂C—O | CH₃NHCH₂CH₂OH | (CH₃)₂C—O, C₄H₉ / Si, CH₃ NH—CH₂ / (CH₃)₂C—O, O——CH₂ |
| (CH₃)₂C—O, C₂H₅ / Si—OC₄H₉ / (CH₃)₂C—O | NH₂C(CH₃)₂CH₂OH | (CH₃)₂C—O, C₂H₅ / Si, NH₂—C(CH₃)₂ / (CH₃)₂C—O, O——CH₂ |
| (C₆H₅)₂C—O, C₆H₅ / Si—OCH₃ / (C₆H₅)₂C—O | NH₂CH₂CH₂OH | (C₆H₅)₂C—O, C₆H₅ / Si, NH₂—CH₂ / (C₆H₅)₂C—O, O——CH₂ |
| (CH₃)₂C—O, CH₂CH₂C₄F₉ / Si—OC₂H₅ / (CH₃)₂C—O | Same as above | (CH₃)₂C—O, CH₂≈H₂C₄F₉ / Si, NH₂—CH₂ / (CH₃)₂C—O, O——CH₂ |

| Silane | Alkanolamine | Product |
|---|---|---|
| (CH₃)₂C—O  C₆H₁₁ \ Si—OCH₃ / (CH₃)₂C—O | CH₃NHCH₂CH₂OH | C₆H₁₁  CH₃ (CH₃)₂C—O \\ NH—CH₂ Si / \\ (CH₃)₂C—O  O—CH₂ |
| (C₆H₁₁)₂C—O  CH₃ \ Si—OC₂H₅ / (C₆H₁₁)₂C—O | Same as above | CH₃  CH₃ (C₆H₁₁)₂C—O \\ NH—CH₂ Si / \\ (C₆H₁₁)₂C—O  O—CH₂ |

That which is claimed is:
1. A spiroheterocyclic pentacoordinate silicon compound having the general formula

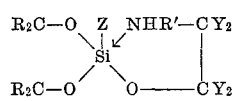

R is selected from the group consisting of hydrocarbon radicals free of aliphatic unsaturation containing from 1 to 6 carbon atoms and the perfluoromethyl radical,
Z is selected from the group consisting of hydrocarbon radicals free of aliphatic unsaturation containing from 1 to 6 carbon atoms and —CH₂CH₂A radicals wherein A is a perfluoroalkyl radical containing from 1 to 4 carbon atoms,
R' is selected from the group consisting of the hydrogen atom and the methyl radical, and
Y is selected from the group consisting of the hydrogen atom and the methyl radical.

2. A compound as defined in claim 1 wherein R is a hydrocarbon radical free of aliphatic unsaturation containing from 1 to 6 carbon atoms, Z is a hydrocarbon radical free of aliphatic unsaturation containing from 1 to 6 carbon atoms, R' is a hydrogen atom and Y is a hydrogen atom.

3. A compound as defined in claim 1 wherein R is a hydrocarbon radical free of aliphatic unsaturation containing from 1 to 6 carbon atoms, Z is a hydrocarbon radical free of aliphatic unsaturation containing from 1 to 6 carbon atoms, R' is a methyl radical and Y is a methyl radical.

4. A compound as defined in claim 1 wherein R is a hydrocarbon radical free of aliphatic unsaturation containing from 1 to 6 carbon atoms, Z is a hydrocarbon radical free of aliphatic unsaturation containing from 1 to 6 carbon atoms, R' is a methyl radical and Y is a hydrogen atom.

5. A compound as defined in claim 1 wherein R is a hydrocarbon radical free of aliphatic unsaturation containing from 1 to 6 carbon atoms, Z is a hydrocarbon radical free of aliphatic unsaturation containing from 1 to 6 carbon atoms, R' is a hydrogen atom and Y is a methyl radical.

6. A compound as defined in claim 1 wherein R is a perfluoromethyl radical, Z is a —CH₂CH₂A radical, R' is a hydrogen atom and Y is a hydrogen atom.

7. A compound as defined in claim 1 wherein R is a perfluoromethyl radical, Z is a —CH₂CH₂A radical, R' is a methyl radical and Y is a methyl radical.

8. A compound as defined in claim 1 wherein R is a perfluoromethyl radical, Z is a —CH₂CH₂A radical, R' is a methyl radical and Y is a hydrogen atom.

9. A compound as defined in claim 1 wherein R is a perfluoromethyl radical, Z is a —CH₂CH₂A radical, R' is a hydrogen atom and Y is a methyl radical.

10. A compound as defined in claim 1 selected from the group consisting of

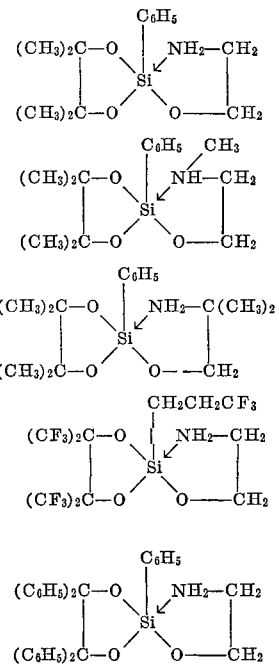

and

References Cited
UNITED STATES PATENTS

| | | | |
|---|---|---|---|
| 3,355,477 | 11/1967 | Frye (I) | 260—448.8 |
| 3,360,525 | 12/1967 | Frye (II) | 260—448.8XR |
| 3,445,426 | 5/1969 | Lee | 260—448.8XR |
| 3,455,980 | 7/1969 | Frye (III) | 260—448.8 |

TOBIAS E. LEVOW, Primary Examiner

P. F. SHAVER, Assistant Examiner

U.S. Cl. X.R.
252—389, 400